Figure 6:
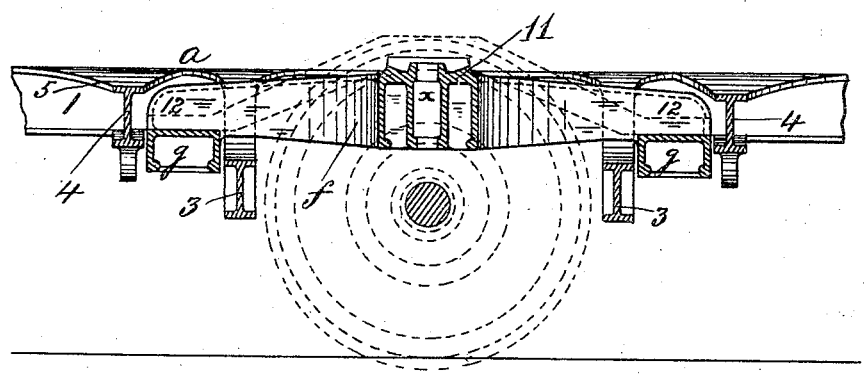

No. 774,492. PATENTED NOV. 8, 1904.
H. M. PFLAGER & C. H. HOWARD.
CAR TRUCK.
APPLICATION FILED JULY 11, 1904.
NO MODEL. 5 SHEETS—SHEET 1.
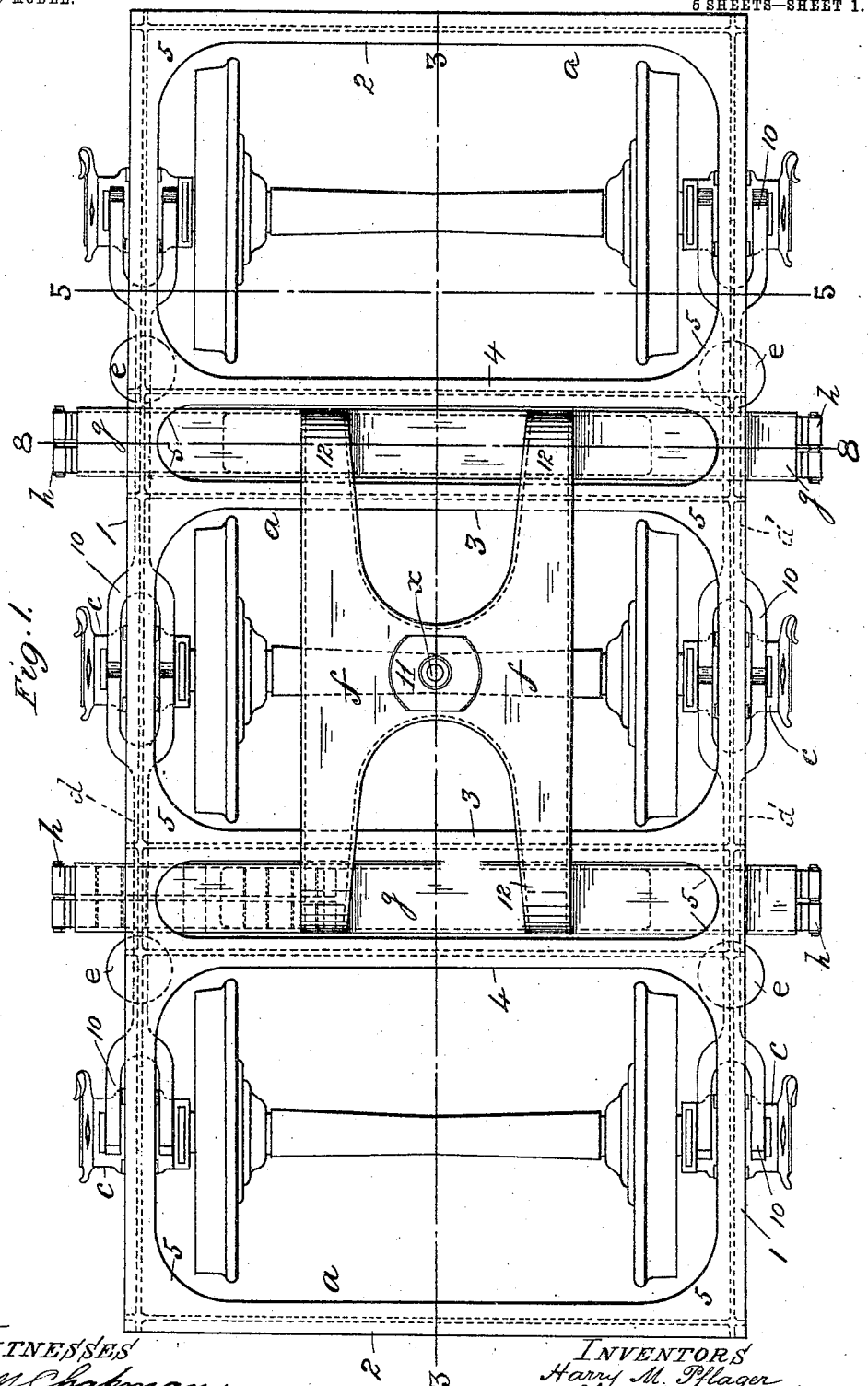
WITNESSES
G. M. Chapman
J. M. Benbow
INVENTORS
Harry M. Pflager
Clarence H. Howard
By Edward W. Furrell
their Atty.

No. 774,492. PATENTED NOV. 8, 1904.
H. M. PFLAGER & C. H. HOWARD.
CAR TRUCK.
APPLICATION FILED JULY 11, 1904.
NO MODEL. 5 SHEETS—SHEET 2.
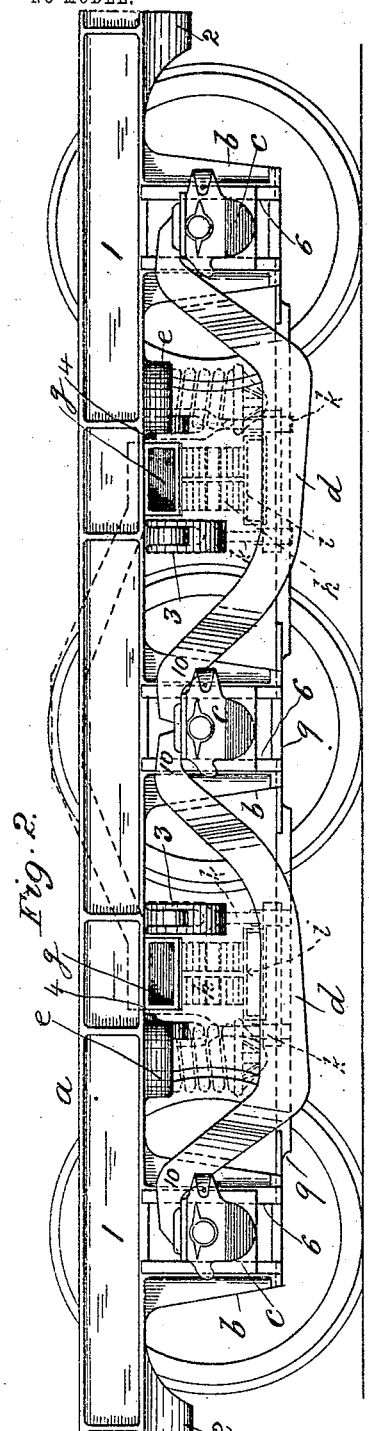
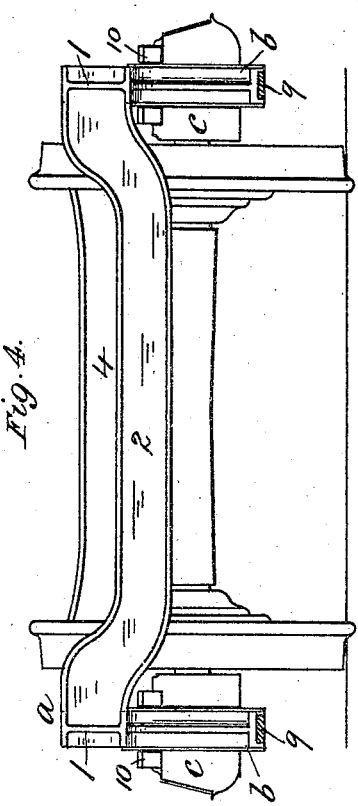
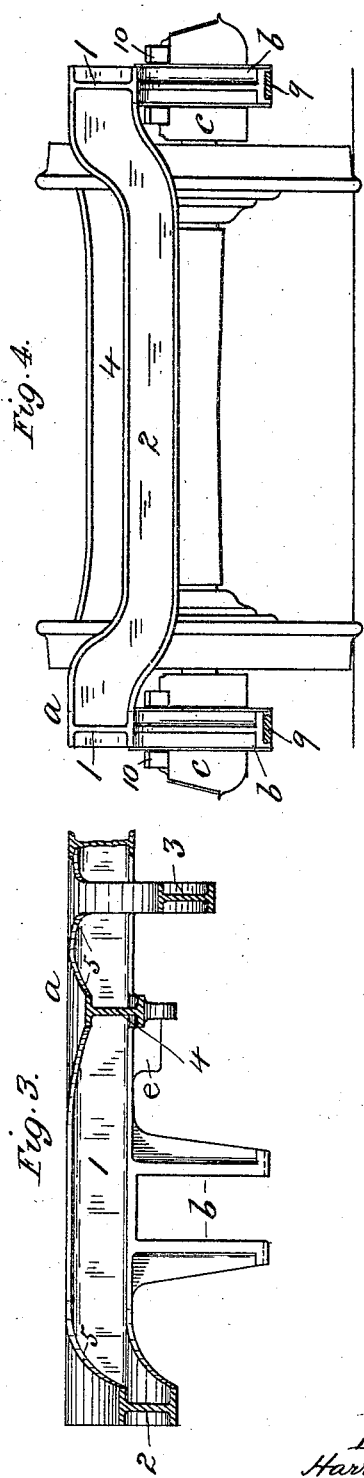
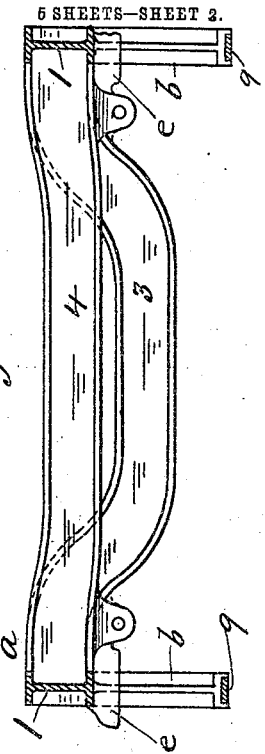
WITNESSES
G. M. Chapman
J. M. Binbow
INVENTORS
Harry M. Pflager
Clarence H. Howard
By Edward W. Furrell
their Atty No. 774,492. PATENTED NOV. 8, 1904.
H. M. PFLAGER & C. H. HOWARD.
CAR TRUCK.
APPLICATION FILED JULY 11, 1904.
NO MODEL. 5 SHEETS—SHEET 3.

WITNESSES
G. M. Chapman
J. M. Benbow

INVENTORS
Harry M. Pflager
Clarence H. Howard
By Edward W. Furrell
their Atty

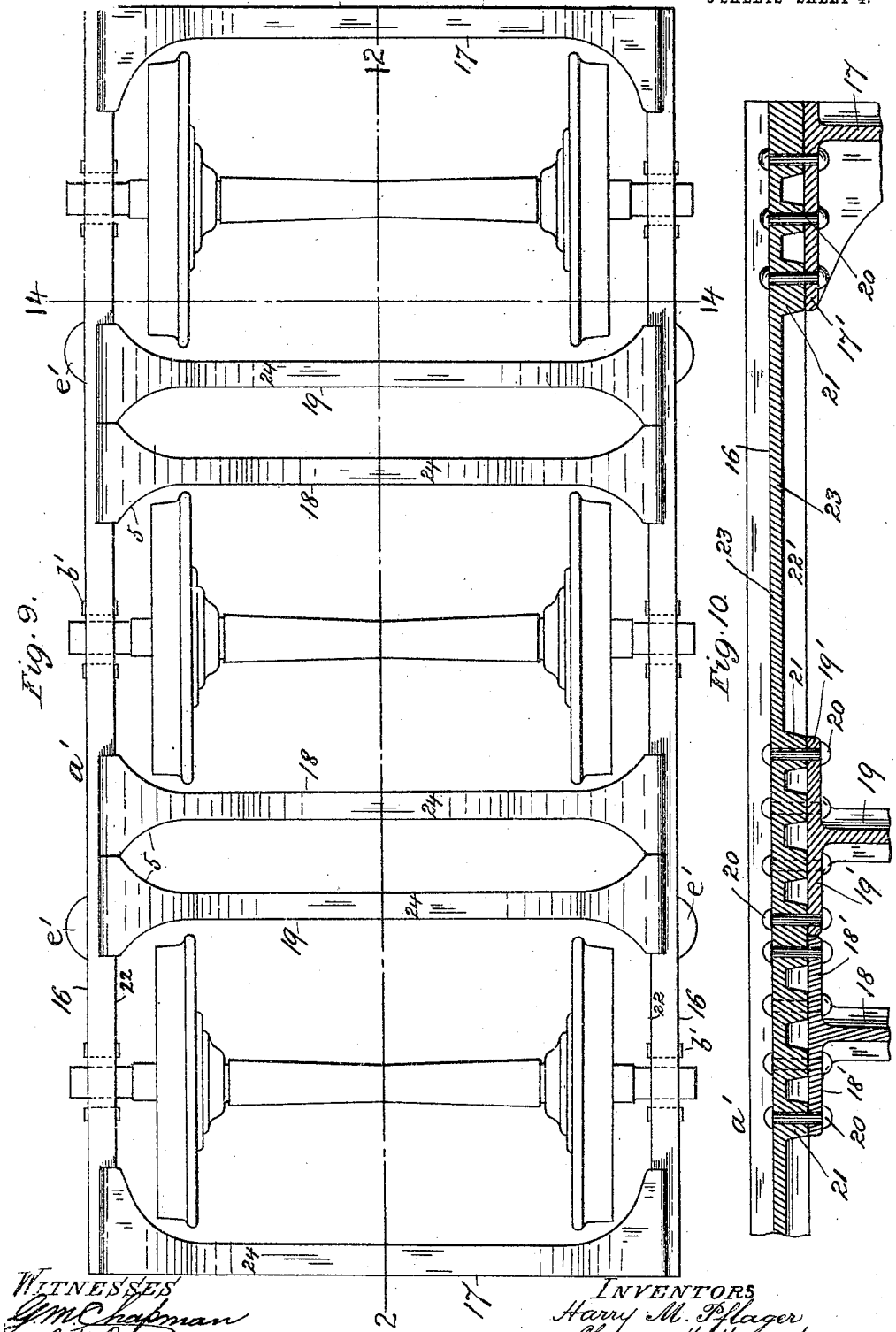

No. 774,492. PATENTED NOV. 8, 1904.
H. M. PFLAGER & C. H. HOWARD.
CAR TRUCK.
APPLICATION FILED JULY 11, 1904.
NO MODEL. 5 SHEETS—SHEET 5.
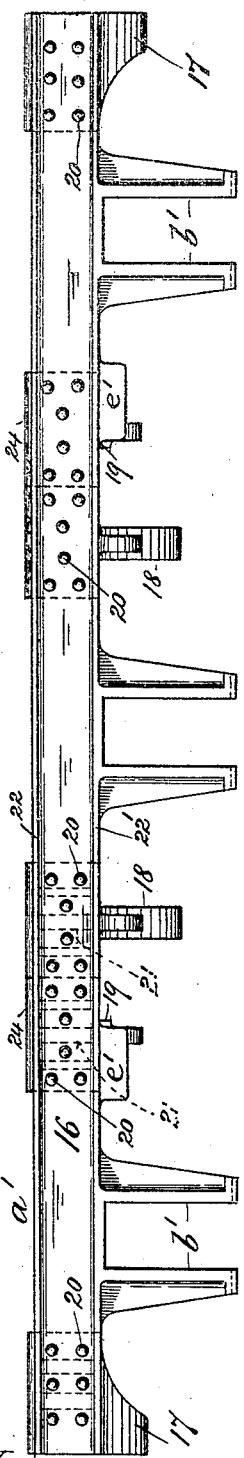
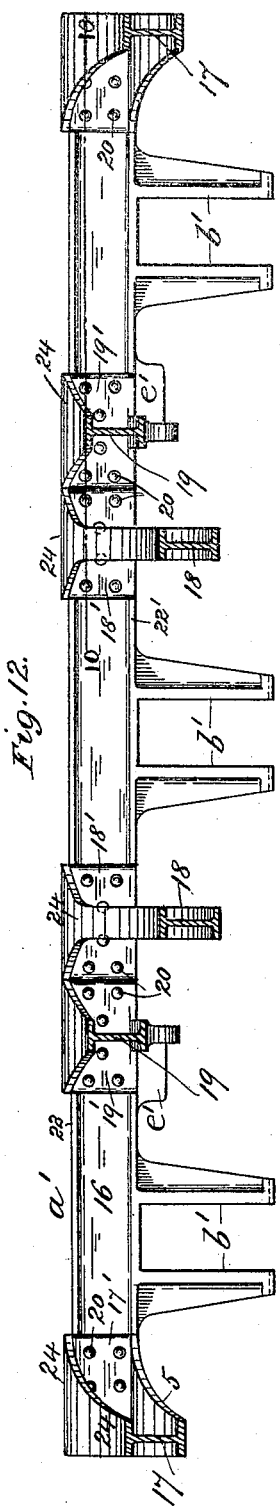
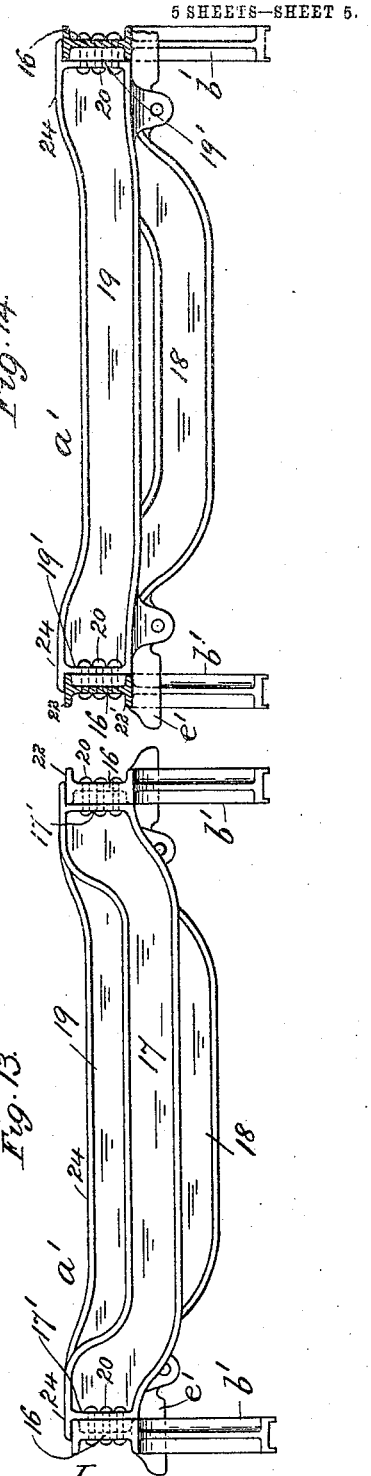
Witnesses
J. M. Chapman
J. W. Benbow
Inventors
Harry M. Pflager
Clarence H. Howard
By Edward W. Furrell
their Atty No. 774,492. Patented November 8, 1904.

UNITED STATES PATENT OFFICE.

HARRY M. PFLAGER AND CLARENCE H. HOWARD, OF ST. LOUIS, MISSOURI, ASSIGNORS TO AMERICAN STEEL-BODY DOUBLE-BOLSTER CO., OF ST. LOUIS, MISSOURI, A CORPORATION OF NEW JERSEY.

CAR-TRUCK.

SPECIFICATION forming part of Letters Patent No. 774,492, dated November 8, 1904.

Application filed July 11, 1904. Serial No. 216,080. (No model.)

*To all whom it may concern:*

Be it known that we, HARRY M. PFLAGER and CLARENCE H. HOWARD, citizens of the United States, residing at St. Louis, in the State of Missouri, have invented a new and useful Improvement in Car-Trucks, of which the following is a specification.

Our invention relates to a railroad-car truck, and has for its object to obtain a car-truck of simple construction combined with lightness, rigidity, and durability.

In the ordinary car-truck the wheel-pieces, end pieces, and intermediate cross-pieces or "transoms" of the frame are of separate construction and composed, respectively, of iron plates with interposed wood beams which are fastened together and the said pieces to each other by bolts combined with separate corner-plates, the pedestals, and equalizing-bar spring-caps, which are also of separate construction, being fixed to the wheel-pieces by bolts. Within the frame so constructed are assembled the composite truck-bolster, (or the respectively composite center-bearing beam and spring-beams and the separate arch-bars, as the case may be,) the springs, the spring-planks, the swing-hangers, the wheels, with their axles and journal-boxes, the equalizing-bars, with their spring seats and caps, and the other appurtenances of a four or six wheeled truck.

Our invention consists principally in substituting, first, for the separate and respectively composite wheel-pieces end pieces and intermediate cross-pieces or transoms; secondly, for the respectively composite center-bearing beam and spring-beams and the separate arch-bars of a six-wheeled truck, (or the composite truck-bolster of a four-wheeled truck, as the case may be,) and, thirdly, for the composite center-bearing beam and separate arch-bars of a six-wheeled truck a single piece composed, preferably, of cast-steel of suitable cross-section and general configuration and disposition of metal combined with features of novelty, as hereinafter described and claimed, reference being had to the accompanying drawings, forming part of this specification, whereon—

Figure 7:
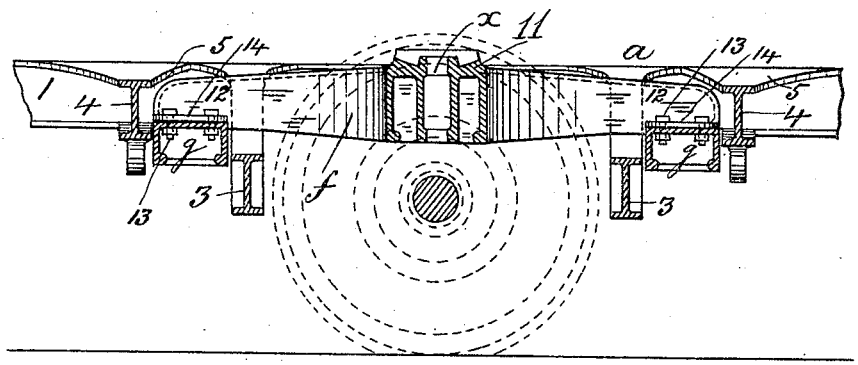

Figure 1 is a top plan of a six-wheeled car-truck constructed according to our invention; Fig. 2, a side elevation thereof; Fig. 3, a vertical longitudinal section through the truck-frame, broken away, on line 3 3 in Fig. 1; Fig. 4, an end elevation of the truck, omitting the center-bearing beam, spring-beams, and other appendages; Fig. 5, a vertical transverse section through the truck-frame on line 5 5 in Fig. 1; Fig. 6, a vertical longitudinal section through the middle portion of the truck-frame on line 3 3 in Fig. 1, showing our improved center beam and spring-beams combined in a single piece; Fig. 7, a similar view to Fig. 6, showing our improved center beam and spring-beams as separate and respectively integral pieces bolted together; and Fig. 8, a vertical transverse section through the wheel-pieces of the truck-frame, the improved center beam, and one of the combined spring-beams on line 8 8 in Fig. 1. Fig. 9 is a top plan of the truck-frame, showing an alternative construction thereof; Fig. 10, a horizontal section, to enlarged scale, through one of the wheel-pieces, broken away, on line 10 10 in Fig. 12, showing a preferable means of fixing the end pieces and transoms thereto; Fig. 11, a side elevation of the truck-frame seen in Fig. 9; Fig. 12, a vertical longitudinal section thereof on line 12 12 in Fig. 9; Fig. 13, an end elevation, and Fig. 14 a vertical transverse section thereof on line 14 14 in Fig. 9.

Like letters and numerals of reference denote like parts in all the figures.

Referring to Figs. 1 to 8 of the drawings, *a* represents a preferable form and construction of our improved car-truck frame, which comprises the wheel-pieces 1, end pieces 2, middle cross-pieces or transoms 3, and outside cross-pieces or transoms 4, arranged similarly to the corresponding parts of an ordinary six-wheeled truck and is composed, preferably, of cast-steel integral throughout, each piece 1 2 3 4 being preferably I-shaped in cross-section, but may be otherwise shaped—such as T, inverted-U, L, or box—as may be found most convenient for casting or suitable in practice. The top flanges of the cross-pieces 2, 3, and 4 are extended at the corners, where they unite with the inside top flanges of the wheel-pieces 1, so as to form curved filling-pieces or gussets 5 thereat, whereby the frame a is strengthened and rendered more rigid at the junctions of the said pieces in resisting the varying strains to which the truck is subjected to thereat.

The horns of the pedestals b for the journal-boxes c are preferably T-shaped in horizontal section and cast integrally with the wheel-pieces 1, respectively, or they may be U or otherwise shaped in horizontal section, as desired.

d represents the equalizing-bars, which in this construction of the pedestals b are formed, respectively, at their ends with longitudinal forks 10, which straddle the pedestals b and bear at each side thereof upon the journal-boxes c, as seen in Fig. 1.

e represents the equalizing-bar spring-caps, which are preferably cast integral with the wheel-pieces 1.

In lieu of the ordinary composite center-bearing beam and separate center plate and arch-bars of a six-wheeled car-truck we substitute therefor a center beam or bolster f, integral throughout and having its central portion 11 (which is the equivalent of the ordinary center plate) integral with the body and perforated centrally at x for the king-bolt, (not shown,) the center beam or bolster f spanning and bearing at its ends upon the spring-beams g, with which it is preferably integral.

To obtain the necessary depth of metal and vertical play to the center beam or bolster f under the action of the main bearing-springs h, the middle cross-pieces or transoms 3 are directed downward from their junction with the wheel-pieces 1 and formed sufficiently low at their middle portions adjacent to the ends of the center beam or bolster f.

Figure 8:
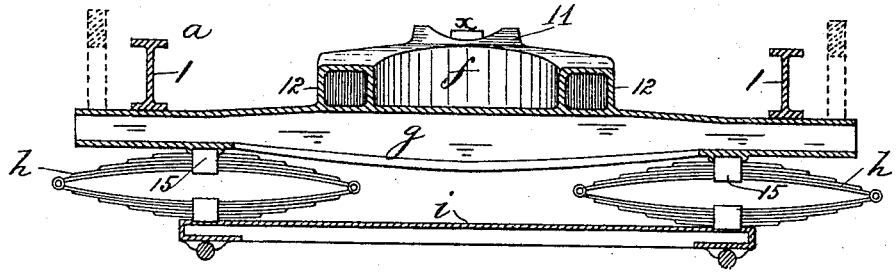

The center beam or bolster f and spring-beams g are composed, preferably, of cast-steel of an inverted-U shape in cross-section, respectively, the shape of the center beam or bolster f in top plan being of a double U or V shape, as shown, or of any other preferred configuration and disposition of metal that may be found best adapted for insuring its rigidity and proper bearing on the spring-beams g, the end portions of its bifurcated members 12 being integrally united to the spring-beams g, as shown in Fig. 8, and bearing thereon at parts preferably corresponding to the bearings of the arch-bars on the spring-beams in an ordinary six-wheeled truck, or the center beam or bolster f in lieu of being made integral with the spring-beams g, as described, may be separate therefrom and fixed thereto by bolts 13, (or rivets,) which pass through lugs or flanges 14, formed on the base of the end portions 12 of the center beam or bolster f and through the top members of the spring-beams g, as shown in Fig. 7.

The end portions of the spring-beams g adjacent to the main bearing-springs h are preferably made box-shaped and otherwise adapted on their under sides to receive the spring-bands 15, which with the springs h, spring-planks i, swing-hangers k, and all the other appendages (not shown) necessary to the full equipment of this class of truck may be of the usual well-known construction and need no further description.

In the alternative construction of our improved car-truck frame a' (shown by Figs. 9 to 14) the wheel-pieces 16, with the pedestals b' and equalizing-bar spring-caps e', the end pieces 17, and intermediate cross-pieces or transoms 18 and 19 are of separate construction, respectively, each of the said pieces being composed, preferably, of cast-steel integral throughout of similar shape in cross-section and general configuration to the corresponding pieces 1 2 3 4, before described, the end pieces 17 and transoms 18 19 being secured to the wheel-pieces 16, preferably by rivets 20, for which purpose the cross-pieces 17 18 19 are formed at their ends for their entire depth, respectively, (corresponding to the depth of the wheel-pieces 16) with lateral flanges 17', 18' 19', which bear against filling blocks or faces 21, formed integrally with the wheel-pieces 16 between their inner top and bottom flanges 22 22', the rivets 20 passing through the flanges 17' 18' 19' and through the filling-blocks 21 and upright web 23 of the wheel-pieces 16, against the outside of which they are clenched or riveted, thereby insuring a rigid connection of the parts with each other, the top flanges 24 of the cross-pieces 17 18 19 being extended longitudinally beyond the flanges 17' 18' 19', so as to overlap the corresponding top flanges 22 of the wheel-pieces 16, and thereby obviate the downward shearing strain on the rivets 20.

What we claim as our invention, and desire to secure by Letters Patent, is—

1. In a car-truck frame, the combination of the wheel-pieces, the end pieces, and the "transoms" having respectively an I shape in cross-section, all the said parts being integral throughout, substantially as described.

2. In a car-truck frame, the combination of the wheel-pieces, the end pieces, and the "transoms" having respectively an I shape in cross-section, and having their top flanges extended to form gussets at the junctions of the said pieces to each other, all the said parts being integral throughout, substantially as described.

3. In a car-truck frame, the combination of the wheel-pieces, the end pieces, and the "transoms," the said parts being respectively integral and having an I shape in cross-section, and means for fixing the said parts together, substantially as described.

4. In a car-truck, the combination with the spring-beams, of a center beam or bolster integral throughout and perforated for the king-bolt, the said beam spanning and bearing upon the spring-beams, and means for fixing the said beam to the spring-beams, substantially as described.

5. In a car-truck, the combination with the spring-beams, of a center beam or "bolster" perforated for the king-bolt and spanning the spring-beams, all the said parts being integral throughout, substantially as described.

6. In a car-truck, the combination with the spring-beams, of a center beam or "bolster" integral throughout and perforated for the king-bolt, the said beam spanning and bearing upon the spring-beams, and having an inverted-U shape in cross-section, and means for fixing the said beam to the spring-beams, substantially as described.

7. In a car-truck, a spring-beam integral throughout, the said beam having its middle portion of an inverted-U shape in cross-section, and its end portions respectively, box-shaped in cross-section, substantially as described.

In testimony whereof we have signed our names to this specification in the presence of two subscribing witnesses.

HARRY M. PFLAGER.
CLARENCE H. HOWARD.

Witnesses:
   B. V. H. JOHNSON,
   EDWARD W. FURRELL.